(12) United States Patent (10) Patent No.: US 8,484,350 B2
Muntermann et al. (45) Date of Patent: Jul. 9, 2013

(54) MESSAGING SERVICE

(75) Inventors: Jan Muntermann, Langen (DE);
Natasa Milic-Frayling, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 12/095,779

(22) PCT Filed: Oct. 19, 2006

(86) PCT No.: PCT/US2006/040941
§ 371 (c)(1),
(2), (4) Date: Jul. 30, 2008

(87) PCT Pub. No.: WO2007/064418
PCT Pub. Date: Jun. 7, 2007

(65) Prior Publication Data
US 2008/0294735 A1 Nov. 27, 2008

(30) Foreign Application Priority Data
Dec. 2, 2005 (EP) .................................. 05026309

(51) Int. Cl.
*G06F 15/173* (2006.01)
(52) U.S. Cl.
USPC ........................................................ 709/226
(58) Field of Classification Search
USPC ................ 709/203, 206, 220, 226, 228, 229, 709/201, 207, 224; 705/1; 714/43; 455/466; 704/8
See application file for complete search history.

(56) References Cited

U.S. PATENT DOCUMENTS

| 5,995,597 | A * | 11/1999 | Woltz et al. ................ 379/93.24 |
| 6,507,812 | B1 * | 1/2003 | Meade et al. ..................... 704/8 |
| 6,629,130 | B2 * | 9/2003 | Mertama et al. .............. 709/206 |
| 7,103,806 | B1 * | 9/2006 | Horvitz ........................... 714/43 |
| 7,159,011 | B1 * | 1/2007 | Knight et al. ................. 709/207 |
| 7,548,946 | B1 * | 6/2009 | Saulpaugh et al. ........... 709/203 |
| 7,987,511 | B2 * | 7/2011 | Brown et al. .................... 726/27 |
| 8,225,219 | B2 * | 7/2012 | Edelen et al. ................. 715/753 |
| 2002/0004832 | A1 * | 1/2002 | Yoon et al. .................... 709/229 |
| 2002/0016818 | A1 * | 2/2002 | Kirani et al. ................. 709/203 |
| 2002/0059391 | A1 * | 5/2002 | Lincke et al. ................. 709/206 |
| 2002/0087704 | A1 * | 7/2002 | Chesnais et al. ............. 709/228 |
| 2002/0161862 | A1 * | 10/2002 | Horvitz ......................... 709/220 |
| 2002/0174199 | A1 * | 11/2002 | Horvitz ......................... 709/220 |
| 2003/0093565 | A1 * | 5/2003 | Berger et al. ................. 709/246 |

(Continued)

FOREIGN PATENT DOCUMENTS

| KR | 1020010079363 | 8/2001 |
| KR | 1020010086838 | 9/2001 |
| KR | 1020020044306 | 6/2002 |
| KR | 1020050071707 | 7/2005 |

*Primary Examiner* — Imad Hussain
(74) *Attorney, Agent, or Firm* — Zete Law, P.L.L.C.; MacLane C. Key

(57) ABSTRACT

A messaging service is described which provides application agnostic and cross-platform messaging. Senders compile message content components and specify message preferences. The messaging service calculates a utility and cost of sending the message over different types of communication channel. A communication channel is selected using the cost and utility information and the message service formats the message content components for the particular communication channel. The message is then sent for example, as email, SMS, MMS or other suitable type depending on the selected channel. The utility is calculated using the sender message preferences, communication channel attributes, sending and recipient device attributes and preferably also, but not essentially, preferences of the recipient.

18 Claims, 10 Drawing Sheets

U.S. PATENT DOCUMENTS

| | | | |
|---|---|---|---|
| 2004/0215472 A1* | 10/2004 | Gleckman | 705/1 |
| 2006/0101115 A1* | 5/2006 | Gleckman | 709/203 |
| 2007/0130340 A1* | 6/2007 | Alperin et al. | 709/226 |
| 2007/0239818 A1* | 10/2007 | Liou et al. | 709/201 |
| 2008/0126491 A1* | 5/2008 | Portele et al. | 709/206 |
| 2009/0124241 A1* | 5/2009 | Krishnaswamy et al. | 455/414.2 |
| 2009/0157869 A1* | 6/2009 | Cleary | 709/224 |
| 2009/0307760 A1* | 12/2009 | Yoshimura | 726/4 |
| 2009/0325609 A1* | 12/2009 | Rosen et al. | 455/466 |
| 2010/0325227 A1* | 12/2010 | Novy | 709/206 |

\* cited by examiner

MESSAGING SERVICE

RELATED APPLICATIONS

This application is a National Stage of International Application No. PCT/US2006/040941, filed Oct. 19, 2006, which claims priority from European Patent Application No. 05026309.4, filed on Dec. 2, 2005. Both applications are incorporated herein by reference.

TECHNICAL FIELD

This description relates generally to messaging services. It is particularly related to, but in no way limited to, messaging services for assessing which of a plurality of communication channels to use.

BACKGROUND

Today many different types of messaging technology are used for communication. For example, email, instant messaging (IM), short message service (SMS), multi-media message service (MMS), wireless application protocol push (WAP push) and so on. This introduces greater choice and flexibility than previously available but at the same time complexity for end users is increased. For example, a message sender often does not have sufficient information about the connectivity, preferences and other relevant aspects of a message recipient. That is, John might not know whether Jane has email access out of office hours and whether Jane prefers email or SMS. This makes it difficult for end users to choose a suitable communication channel to reach a recipient, particularly if the message needs to be delivered within a certain time frame, while the person is at a particular location, or similar.

The complexity mentioned above is introduced not only because communication devices are equipped with multiple channels of communication but also because those communication channels (e.g. email, instant messaging, voice, text and multi-media messaging) are disconnected or independent of one another both on the same communication device and also across devices.

At present senders typically have to manage multiple user accounts and contact numbers/addresses for the same recipient. Also, both the sender and the recipient have to manage multiple channels of communication. For example, different communication channels provide different features and capabilities and often it can be difficult for an end user to quickly and accurately assess the best communication channel to use in a particular situation.

Another problem relates to the lack of cross-platform communication capabilities. For example consider a user operating an email client on his or her PC. That user creates an email containing particular text. However, typically it is not possible for the user to send that same text message from the email client directly to a recipient as an SMS message. Generally, the user would need to copy or retype the text into an SMS message on a mobile phone and then send the SMS message to the recipient. However, this is time consuming and error prone. In addition, both the sender and recipient need to have the same type of communication channels and the corresponding client applications available. If the recipient has a different set of communication accounts (email address, mobile number, instant message account, etc.) to which the message could be sent, the sender needs to subscribe to all of these communication accounts in order to take advantage of the recipient's connectivity.

Previously attempts have been made to increase the amount of information available to senders about recipients in order to enable senders to make better choices about sending messages. Some of these previous attempts have used limited forms of automatic message conversion although various drawbacks with these approaches exist as now discussed.

Nakanishi et al. in their paper "iCAMS2: Developing a Mobile Communication Tool using Location Information and Schedule Information with J2ME", Proceedings of Mobile HCI, 2003, 400-404 describe a scheme for sending messages between members of a closed user group. Depending on the recipient's situation and context the available communication channels are ordered and displayed according to their suitability. However, the scheme requires location and schedule information to be shared between members of the group so that group members must be willing to share this sensitive and private information. This approach is difficult to extend to a wider user group because security problems arise as a result of the shared sensitive information. Also, in this scheme, the sender's communication device must support the chosen communication channel; there is no ability for automatic message type conversion.

Maniatis et al. describe a message layering model which adds personal information to a traditional layering model consisting of application, transport/network and link layers (Maniatis et al. "The Mobile People Architecture". Mobile Computing and Communications Review, 1, 2, 1999, 1-7). The additional layer information is used to route incoming messages to the application/device currently used by the recipient. Thus the recipient has a personal communication proxy over which messages are redirected and, if necessary, converted into different message formats. A problem with this approach is that incoming messages are redirected to all currently available devices. This increases network load and also leads to serious problems when large amounts of data are sent to devices with low bandwidth connectivity or when the device has a low receiving capacity, e.g., limited message storage space. Also, data may be inadvertently sent to devices that are incapable of processing data in that format. The particular automatic message conversion feature used is problematic in that not all parts of messages are converted. As a result, some information is lost during message conversion and no provision is made to inform the sender about this loss.

Tang et al. (ConNexus to awarenex: extending awareness to mobile users, in Proceedings of the SIGCHI conference on Human factors in computing systems, 2001, 221-228), describe a prototype for mobile devices which provides location and connectivity information for a closed user group. In order to provide simple support for identifying an appropriate communication channel, the system highlights the channel with the most recent activity. However, the channel with the most recent activity might no longer be the most appropriate channel to use. Also, this approach suffers from security problems related to the need to share sensitive information between users.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A messaging service is described which provides application agnostic and cross-platform messaging. Senders compile message content components and specify message preferences. The messaging service calculates a utility and cost of sending the message over different types of communication channel. A communication channel is selected using the cost and utility information and the message service formats the message content components for the particular communication channel. The message is then sent, for example, as email, SMS, MMS or other suitable type depending on the selected channel. The utility is calculated using the sender message preferences, communication channel attributes, sending and recipient device attributes and preferably also, but not essentially, preferences of the recipient. In another embodiment, the cost can be subsumed in the utility function and vice versa.

In an example, a message server is arranged to send a message from a sending entity to a recipient entity over one of a plurality of communication channels. The sending entity can be a user with a communications device such as a PDA, laptop computers mobile phone or other communications device or the sending entity can be an automated service. This also applies to the recipient entity. The message server comprises:

an input arranged to receive message attribute values associated with the message and one or more message content parts for the message;

an input arranged to access communication channel attribute values associated with one or more of the communication channels; sending entity attribute values associated with the sending entity and recipient entity attribute values associated with the recipient entity;

a processor arranged to calculate a utility of sending the message over at least one of the communication channels on the basis of at least some of the message attribute values, communication channel attribute values, sending entity attribute values and recipient entity attribute values;

an output arranged to format one or more of the message content parts for sending over one of the communication channels, said communication channel having been selected on the basis of the calculated utility.

In this way, cross-platform and application agnostic messaging is provided because the message server automatically formats the message content parts as appropriate for the selected communication channel. The sender does not need to make his or her own choices about what type of messaging to use, be it SMS, MMS, email or other. In addition, because the message server calculates utility using the attribute values then a communication channel is selected in a manner which is designed to give the best performance for the sender taking into account many factors including at least channel characteristics, sending and receiving entity characteristics and message characteristics.

In another example a corresponding method of sending a message from a sending entity to a recipient entity over one of a plurality of communication channels is provided. This uses the following steps which for example are carried out at the message server.

receiving message attribute values associated with the message and one or more message content parts for the message;

accessing communication channel attribute values associated with one or more of the communication channels, sending entity attribute values associated with the sending entity and recipient entity attribute values associated with the recipient entity;

calculating a utility of sending the message over at least one of the communication channels on the basis of at least some of the message attribute values, communication channel attribute values, sending entity attribute values and recipient entity attribute values;

formatting one or more of the message content parts for sending over one of the communication channels, said communication channel having been selected on the basis of the calculated utility.

In another example a message sending entity is provided. The message sending entity can be a communications device with software for inter-working with the message server mentioned above. It can also be an automatic service or a communications device which accesses from elsewhere the functionality for inter-working with the message server. The message sending entity comprises:

an input arranged to receive information about message content to be used for a message to be sent;

an input arranged to receive message characteristics associated with the message;

an output arranged to send the message characteristics to a message server;

an input arranged to receive information about available communication channels for sending the message and utility values associated with those communication channels; and an output arranged to send information about a selected communication channel to the message server and to send the message content to the message server.

Sending entity devices and applications can be different from and potentially incompatible with recipient entity devices and applications. The messaging server, by reformatting message content parts is able to deal with this. The reformatting is such that the resulting message is compatible with the recipient entity and its messaging application software.

Preferably the processor is also arranged to calculate the utility on the basis of a cost of sending the message over at least one of the communication channels.

Preferably external context information is also received and the utility calculated on the basis of at least some of this external context information. For example, the external context information can be about the state of the messaging server itself (how busy the server is), network congestion information, information about the population of users and information from independent sources such as from RSS feeds or web-based services. In the event of an earthquake, for example, this information could be used to advise against use of email.

Preferably the input is arranged to receive recipient message preference attribute values and the utility is calculated also on the basis of at least some of those recipient message preference attribute values. This is advantageous because the recipient message preferences can be taken into account, for example, if the recipient prefers SMS over email at particular times of day.

Advantageously the processor is arranged to form a utility relation vector covering the relation of utilities when sending the message via one communication channel compared to another. This enables a comparison of the utility values for the various communication channel options to be achieved in a fast and computationally inexpensive manner.

Preferably the processor is also arranged to form a cost relation vector. This enables a comparison of the cost values for the various communication channel options to be achieved in a fast and computationally inexpensive manner.

Preferably the processor is arranged to concatenate the utility relation vector and cost relation vector and to apply a metric to the concatenated vector to enable the communication channels to be ranked in terms of utility and cost. This enables a selection of a communication channel to be made effectively and simply with low computational cost.

In an example the message server is arranged to send the calculated utility information to the sending entity and to receive information about a selected communication channel from that sending entity. Advantageously this gives control to the sender to be able to select a particular communication channel on the basis of the utility (and/or cost) information.

In another example the message server is arranged to select a communication channel for sending the message on the basis of at least the calculated utility. This is advantageous where the sender requires an automatic service in which the channel selection is made without consulting the sender about the options available together with the utility and or cost information.

Preferably the output is also arranged to send information about message status to the sending entity and or the recipient entity. For example, this can comprise a read receipt, delivery information and or information about any message content parts omitted from the sent message.

Any of the methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
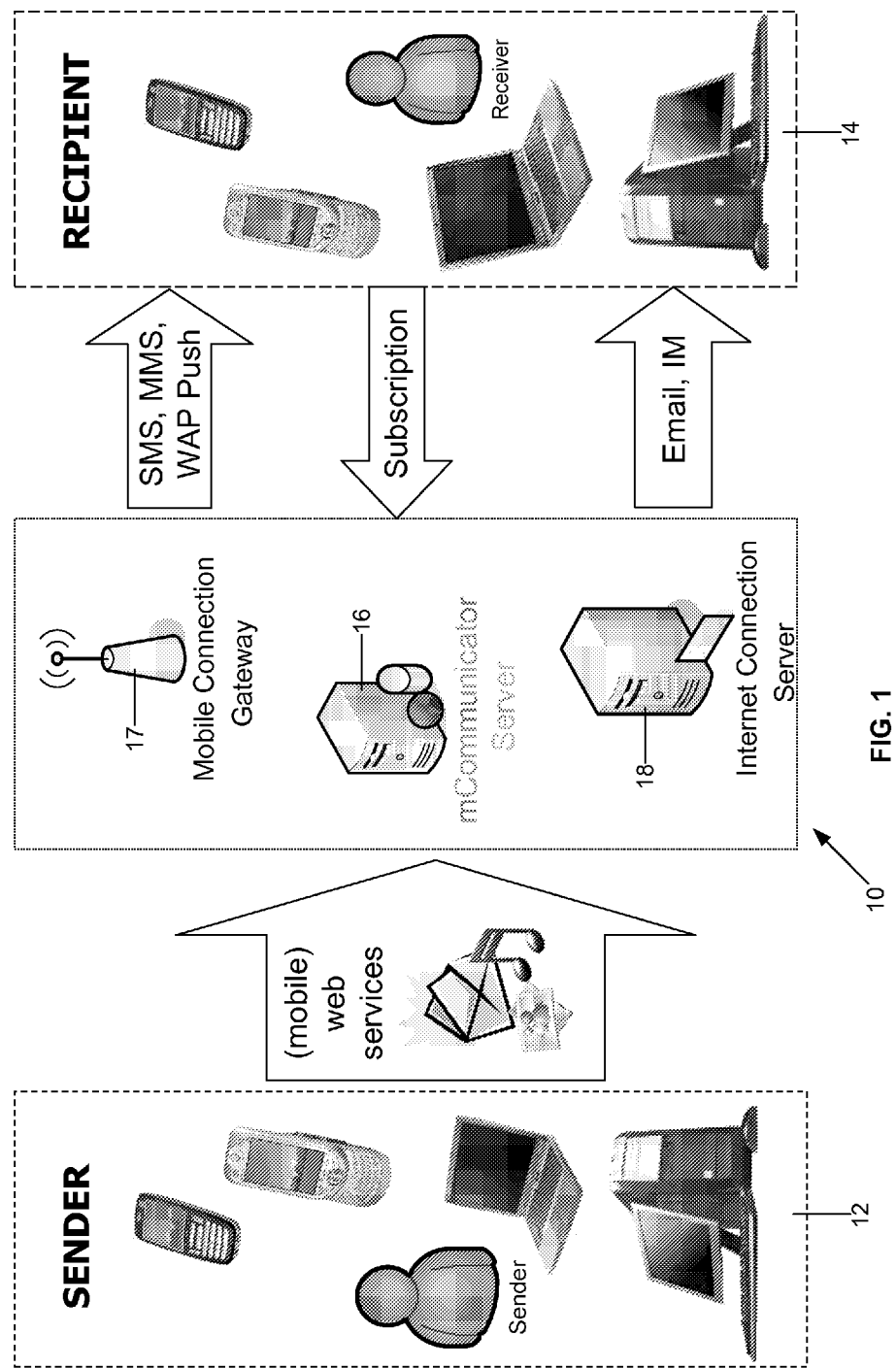
FIG. 1 is a schematic diagram of a communications network providing a message service.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As mentioned above, there currently exists a variety of messaging services that use different infrastructures and technologies such as internet/email and GSM/SMS. The present invention is particularly concerned with messaging services which support asynchronous communication among users or between services and users. Having said that, the invention is in no way limited to asynchronous communication. The term "asynchronous communication" is used to refer to communication comprising messages sent from a sender at one time and intended to be received by or expected to be responded to by a user after a significant time interval. For example, voice mail messages, email messages, text messages and the like. In contrast, synchronous communication is carried out in real-time such as a voice call. In addition, the present invention is primarily concerned with, but not limited to, message push situations where a sender initiates sending of a message to a recipient. Furthermore, the message might open a synchronous communication channel (e.g. chat client or telephone call). In contrast, message pull requires a recipient's initiative or request for information. Implementations of messaging systems may involve a mixed approach that combines push and pull approaches. For example, a message may be delivered to the recipient in two steps: first the system sends a notification that a message has arrived into the system and provides a link to the message to enable the user to pull the content onto the device.

We recognise that a sender of a message is typically faced with several decisions, with little information to rely upon. We summarise the situation faced by the sender of a message by the following three questions:

What is the most appropriate messaging application (e.g. email, SMS, other) to use for sending a particular message, having in mind its specific characteristics?

What is the best way to deliver a message to the recipient, having in mind, but not restricted to, the recipient's connectivity and the status of the available channels?

How can the two prior goals be attained while optimising the total utility for the sender and recipient, including the communication cost?

We have developed a messaging service which addresses these issues and which also provides application agnostic and cross-platform messaging. The term "application agnostic" is used herein to refer to a messaging service which is operable with any type of messaging application be it email, SMS, MMS, or other. The term, "cross-platform messaging" is used to refer to the ability to send messages between entities supporting different message types, through the provision of automatic message type conversion.

FIG. 1 is a schematic diagram of a communications network 10 providing a messaging service. A sender 12 is represented schematically as having one or more communications devices such as mobile telephones, personal digital assistants, laptops, personal computers and the like. (However, it is also possible for the sender to be an automated service itself.) Those communications devices (referred to as clients) are arranged to communicate with a message server 16 referred to herein as mCommunicator Server (trade mark). This communication is achieved in any suitable manner such as using an internet connection. In a preferred example, each of the communications devices or clients also comprises message application software for interworking with the message server 16. Preferably, but not essentially, this message application software is compatible with different types of communication device such as smartphones, PDAs, desktop computers and other devices. However, it is not essential for the message application software functionality to be present at the communications devices. It is also possible for this functionality to be held at the messaging server 16 or other network entity and drawn on by the clients as is known in the art such as a web-based/browser-based message application.

FIG. 1 also shows a recipient 14 and schematically represents a plurality of communications devices that are available to the recipient in a similar way as for the sender 12. Each of the recipient communication devices is connected to the communications network 10 by an internet connection or other suitable type of connection. The recipient communication devices preferably also comprise the message application software or have access to this software. In the same way that the sending entity can be an automated service the recipient entity can also be an automated service.

The communications network 10 also comprises a mobile connection gateway 17 and an internet connection server 18 both in communication with the message server 16. Any other suitable types of gateway can also be used, such as various instant messaging gateways. The message server 16 is responsible for managing and processing incoming messages. It saves message components in a database server (which is either integral with the message server or in communication with the message server) and, for the specified recipient, determines potentially available communication channels. In addition the message server 16 proposes suitable communication channels, compiles the content of messages in appropriate formats and initiates delivery of messages via a chosen channel to the recipient. In the case that email or instant message channels are chosen the message server 16 makes use of the internet connection server 18 to send the message. In the case that SMS, MMS or WAP Push channels are chosen the message server 16 makes use of the mobile connection gateway 17 to send the message as indicated in FIG. 1. As mentioned above, other types of gateway can also be used and this means that messages of other types can also be sent using the message service.

FIG. 1 also illustrates a subscription or registration process. Users of the messaging service provided over the communications network 10 preferably subscribe to this messaging service be they senders 12, recipients 14 or automated services acting as senders 12 or recipients 14. In one embodiment, as part of the subscription process, users provide information about their contact details, messaging preferences and available communication devices/channels. This information is stored for use by the messaging service. However, this is not essential. The messaging service can use any suitable means to obtain information about users' contact details, messaging preferences and available communication devices or channels. These can include using information from a presence management system as known in the art, using historical information about users' past messaging behavior and using information available in databases associated with network operators, other service providers or cooperate groupware systems.

Figure 2:
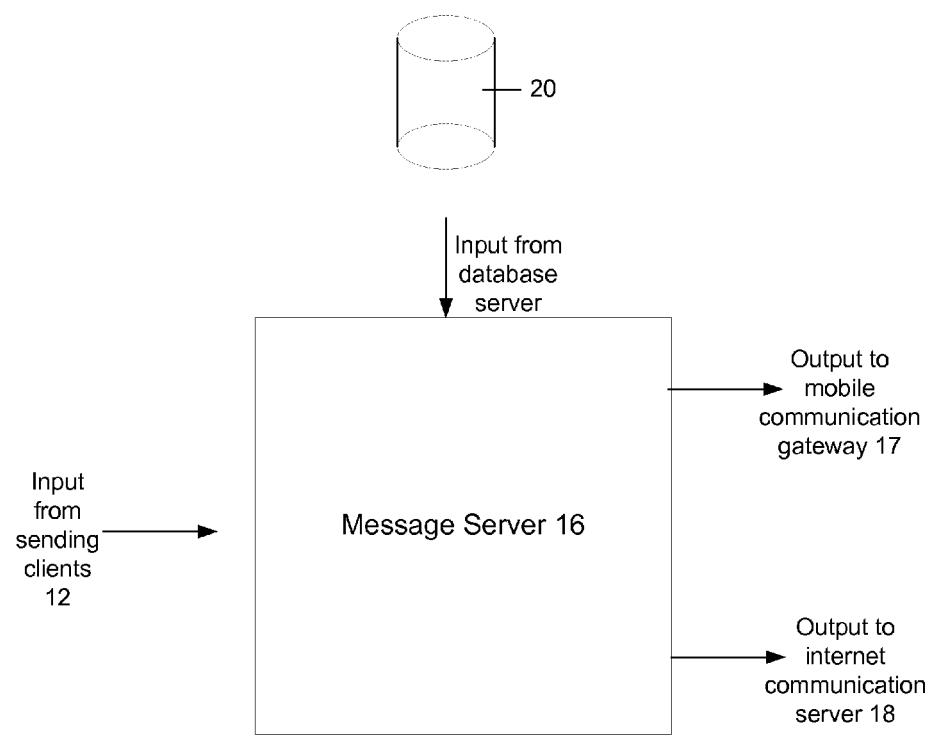
FIG. 2 is a schematic diagram of a message server.

FIG. 2 illustrates the message server 16 in more detail. It receives input from a database server 20 which is of any suitable type. The database server 20 stores information about users, user messaging channels, users' status and messages. That information is obtained in any suitable manner as known in the art. The term "user messaging channels" is used to refer to available means for enabling a user to communicate messages with another user, for example, email, SMS, MMS etc. The user messaging channels depend on the types of communication devices available to the users since individual devices typically support only selected messaging types.

Figure 3:
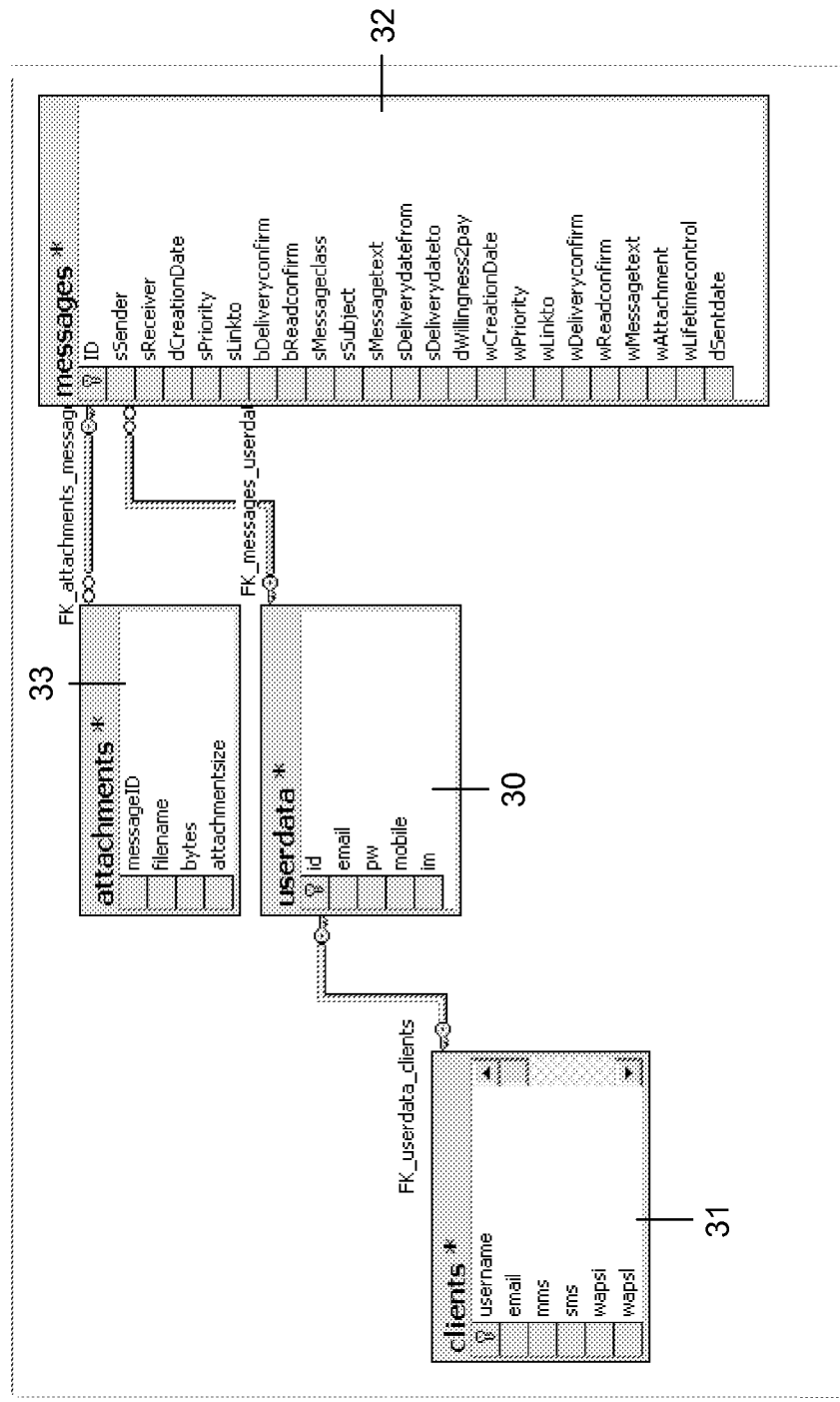
FIG. 3 is an example of a database scheme for use by a messaging service.

FIG. 3 is an example of a database schema used by the database server 20 showing examples of tables and relationships among tables. Table userdata 30 stores personal information about the users of the message service. Besides username and password which are used for identification and authorization, it stores user contact information such as email address, mobile phone number and instant messenger address. Another table is used to store client information (see table clients 31 in FIG. 3). This table stores the connectivity status of users as well as the timestamp of the last successful use of the message service by the user. Information about sent and unsent messages is stored in a third table referred to as table messages 32. This table also stores the message delivery date if appropriate. Another table called attachments table 33 stores all binary data (attachments like images, sound files, etc.) of the messages.

In a preferred example, the communication between the message server 16 and the clients 12 is achieved using web services and requires internet or other suitable connectivity between the clients and message server. In a particularly preferred embodiment the message server 16 provides two web services, one for user management and one for message processing. These web services use different functions for the communication between clients 12 and message server 16 as summarised below.

Example user management functions are given in the following table:

| Function Name | Parameters | Return |
| --- | --- | --- |
| Login( ) | sID: string<br>sPW: string | sLoginstatus: string |
| Getusers( ) | –/– | aUsernames: array |
| Adduser( ) | sID: string<br>sPw: string<br>sEmail: string<br>sMobile: string<br>sIM: string | sCreationstatus: string |
| Updateclient( ) | sID: string<br>sClient: string | sUpdatestatus: string |
| Getuserdata( ) | sID: string<br>sPw: string | aUserdetails: array |

Example message processing functions are given in the following table:

| Function Name | Parameters | Return |
| --- | --- | --- |
| send | sSender: string<br>sReceiver: string<br>dCreationDate: date<br>sPriority: string | ID: GuID |

| Function Name | Parameters | Return |
| --- | --- | --- |
| | sLinkto: string<br>bDeliveryconfirm: bool<br>bReadconfirm: bool<br>sMessageclass: string<br>sSubject: string<br>sMessagetext: string<br>sNetworkconnection: string<br>dDeliverydatefrom: date<br>dDeliverydateto: date<br>dWillingness2pay: double<br>wCreationDate: double<br>wPriority: double<br>wLinkto: double<br>wDeliveryconfirm: double<br>wReadconfirm: double<br>wMessageclass: double<br>wSubject: double<br>wMessagetext: double<br>wAttachment: double<br>wLifetimecontrol: double<br>wNetworkconnection: double | |
| Confirm | sId: Guid<br>sChannel | |
| saveAttachment( ) | sID: string<br>sFilename: string<br>aAttachment: array of bytes<br>lAttachmentsize: long | |
| delete | sID: Guid | |

As mentioned above, in a preferred example, messaging application software is provided at the clients 12 for interaction with the message server 16. This software provides the following functionality:

login to the message server 16
compose a message
specify message attributes
send messages to the message server 16
a communicate with the server about the messaging process (receive notification about the message status, modify the delivery request, etc.).

Optionally it also provides user management functions such as setting up a new user account. FIGS. 4 to 7 show screen shots from example messaging application client software. These are explained in more detail later in this document.

A method of using the message service to send a message is now described with reference to FIG. 8.

An end user first selects one of his or her communications devices 12 (in FIG. 1) and using the message service client software provided thereon or accessed therefrom, compiles content for a message to be sent. This content can comprise text, voice recording, image file attachments, or any other suitable type of content (see step 80 of FIG. 8). Information comprising the recipient details, characteristics of the message and the sender's preferences for message delivery are sent to the message server 16 (see FIG. 1). This is sent either with or without the message content itself (see step 81 of FIG. 8). In the case that the end user is an automated service or proxy steps 80 and 81 are carried out using a rule based system or any other suitable automated means.

Figure 8:
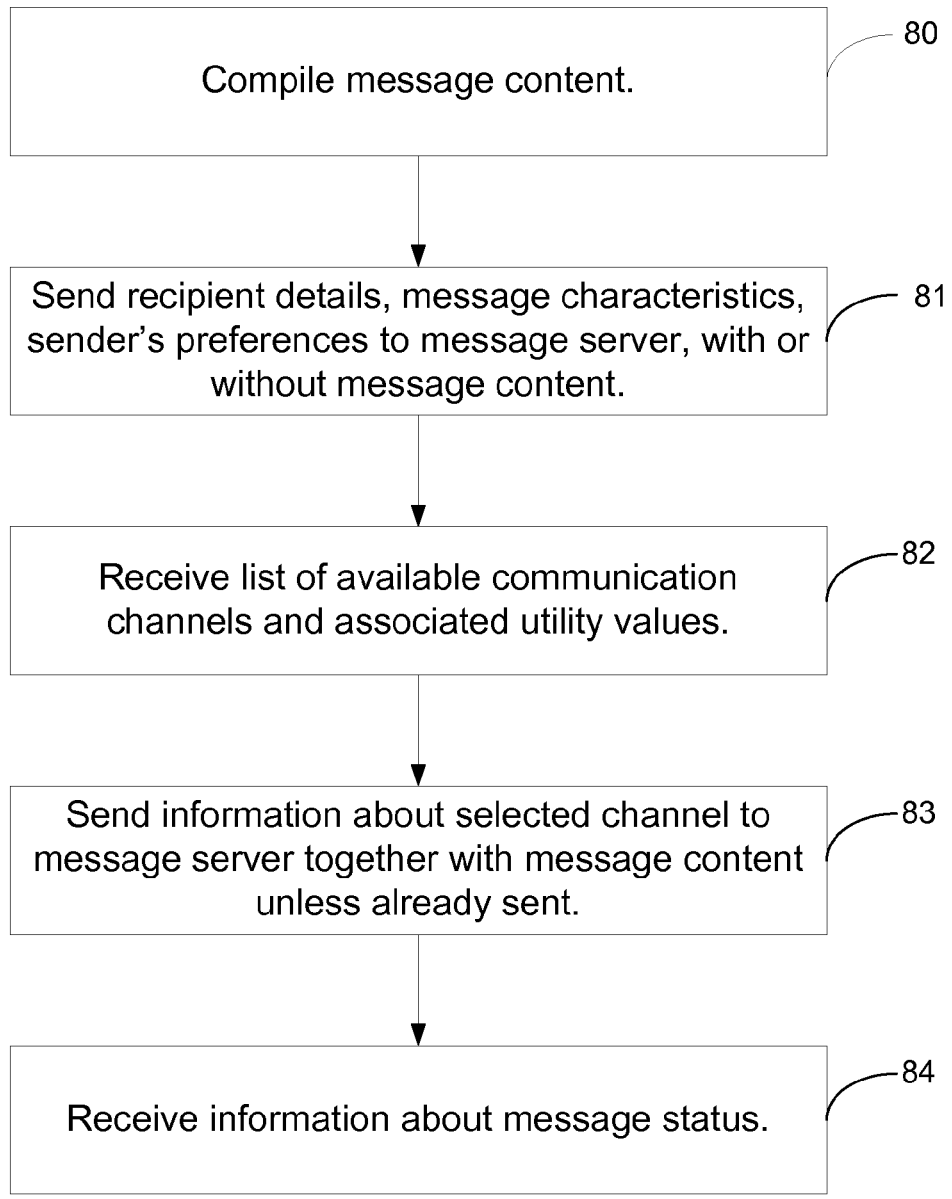
FIG. 8 is a flow diagram of a method of using a message service to send a message.

The client device 12 then receives from the message server 16 a list of available communication channels for the proposed message together with a utility value and with or without a cost value for each of those available communication channels (see step 82 of FIG. 8). For example, in a simple form the utility value comprises a cost of using a particular channel and/or a number of supported message parts. Supported message parts are those parts of a message which can be sent and received over a particular communication channel. For example, supposed the communication channel supports SMS only, then the text part of a message is a supported message part but any attachments, images or sound recordings are not supported message parts.

It should be noted that it is not essential for the client to receive a list of available communication channels together with utility and cost information associated with those. It is also possible for the message server to select by itself one of the communication channels on the basis of the utility information and/or the cost information.

The sender selects one of the available communication channels and sends information about this selection to the message server. Unless already sent, the message content is also sent to the message server at this stage. (See box 83 of FIG. 8). The sender then optionally receives information about the status of the message from the message server (see box 84). For example, this comprises information about whether the message has been sent and a delivery time. The sender also has the ability to revoke the message until a particular time. In some embodiments that particular time is the time that the message content is displayed or presented to the recipient. That is, in a preferred embodiment control over a message by the messaging system is retained until that message is actually displayed. The message can be revoked prior to that point. In order to achieve this, no intermediate message caching on the recipient device is used that would prevent control of the message by the messaging system prior to display. In one such implementation a message is delivered straight from the message server at the time the recipient application is prepared to display the content. However, other embodiments are also provided in which messages are loaded locally at the recipient entity for later presentation. In that case the messages can be revoked only prior to download to the recipient entity.

Figure 9:
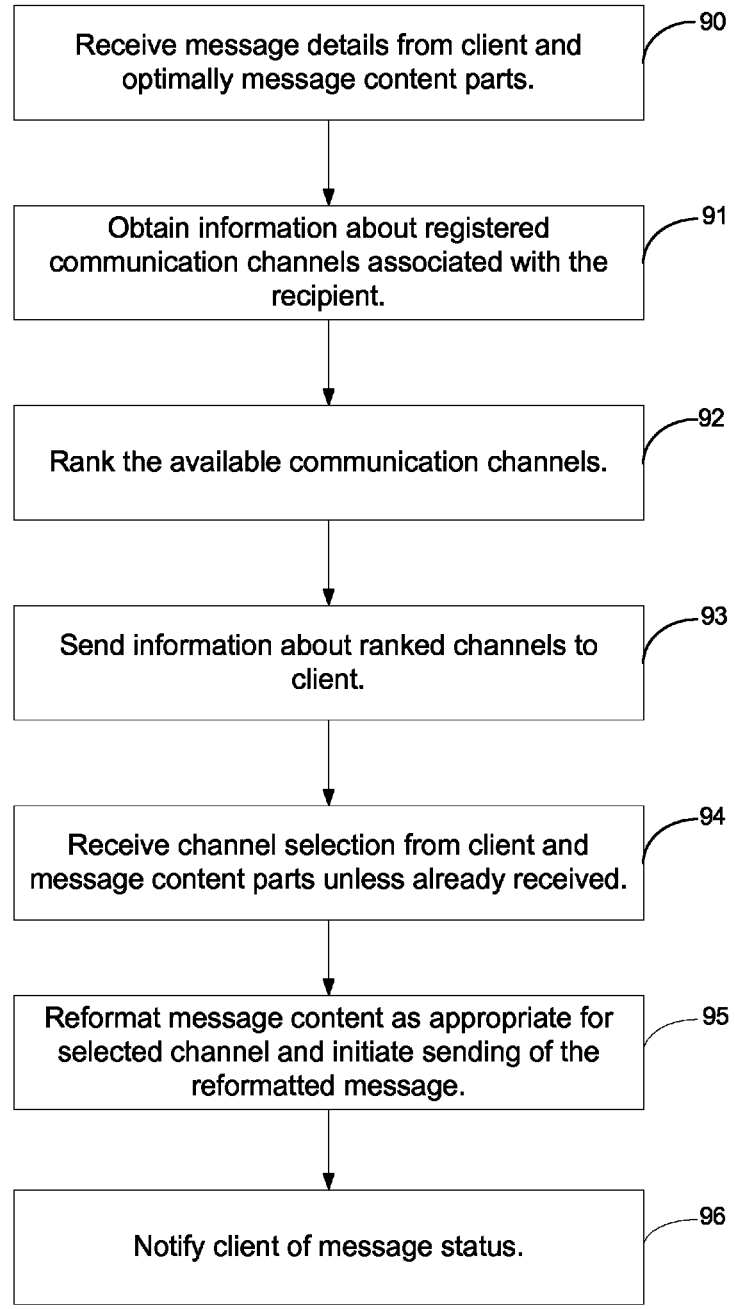
FIG. 9 is a flow diagram of a method carried out on a message server.

FIG. 9 is a flow diagram of the method carried out by the message server 16. This comprises receiving message details from a client (see step 90). The message details comprise recipient details, message characteristics, sender's preferences and optionally, the message content. The message server next accesses the database server 20 to obtain information about registered communication channels associated with the recipient (see box 91 of FIG. 9) including information about the status of those channels. For example, it may have information about how many unread recently received messages are in the recipient inbox for e-mail messages. The message server next ranks the available communication channels (see box 92 of FIG. 9). This is done on the basis of the information about the registered communication channels of the recipient, the status of those channels, the sender's preferences and the message characteristics. In another embodiment it is also based on information about the recipient's preferences or other specifications that may involve a more general context. For example, the specification may come from the status of the communication service, or external information that the service may receive, e.g., RSS news, Web traffic statistics, etc. In another embodiment, it may be based on the aggregate information about the population of users that are using the service. For example, the messaging system can be arranged not to process attachments if the system is overloaded with user messaging due to an external event, e.g., a stock market crash, natural disaster, or similar.

The message server sends information about the ranked channels to the client (see box 93 of FIG. 9) and in return receives information from the client as to which of the channels the end user has selected (see box 94 of FIG. 9). Information about channel ranking can be as detailed as required to facilitate the sender's decision. For example, in addition to the cost of message sending, the sender is informed about the restrictions that the channel may have such as inability to send attachments via SMS. Once the user makes a decision, if the message server has not yet received the message content from the client it does so at this point. The message server then repackages the content of the message, formatting it for the particular selected channel (see box 95) and initiates sending of the message via the selected channel. For example, if the user selected SMS, the content is stripped of the attachments and only the text of the message is delivered. The message server also notifies the client of the status of the message for example, by specifying a delivery time and/or a read receipt (see box 96).

It is also possible for the message server to incorporate additional information into the reformatted message. For example, this comprises information about omitted message parts. In this way the recipient is informed that, for example, a received text message is associated with a sound recording attachment that has not been sent. In addition, the step 96 of notifying the client of the message status, preferably includes notifying the client of any message parts which have not been sent because they were not supported.

Thus it can be seen that the ability to provide cross-platform and application agnostic messaging is achieved by decompiling a message into message content parts and recompiling that message in a form suitable for a selected communication channel. Preferably, but not essentially, the decompilation is achieved as a result of a web-based communication link between the client and message server. As a user selects message content parts to add to the message, such as text, file attachments, subject headings, image attachments, sound recording attachments, etc., those message content parts are identified as components to be sent to the message server via the web link. Decompilation has then already taken place before the message components reach the message server. Recompilation is achieved by using rules, frames, schemas or other suitable structures to define formats required for particular communication channels (such as SMS to a mobile phone, or email to a PDA).

Figure 10:
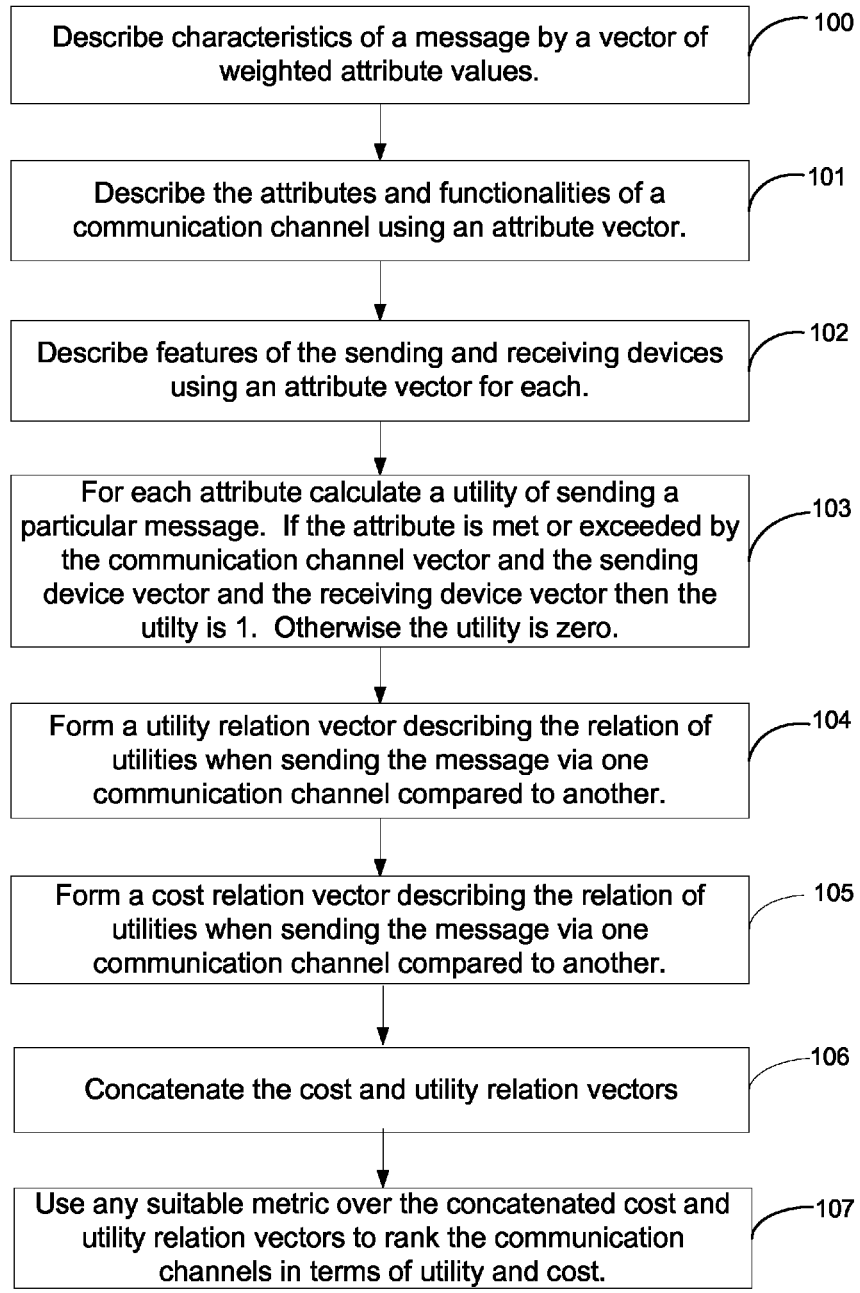
FIG. 10 is a flow diagram of a method of ranking communication channels in terms of utility and cost.

More detail about the method used by the message server 16 to rank the available communication channels is now given with respect to FIG. 10.

FIG. 10 is a flow diagram of one example of a method of calculating a utility and a cost of sending a message over particular communication channels. Characteristics of a message are described by a vector of weighted attribute values (box 100 FIG. 10). Also, the attributes and functionalities of a communication channel are described using an attribute vector (box 101 of FIG. 10). The features of a sending and a receiving device are also described using an attribute vector for each (box 102, FIG. 10). Each communication channel and device are analysed and the values of their attribute vectors are pre-specified by an operator such as the message service provider or network operator. Pre-specified rules, criteria or other information are used to automatically determine the attribute values for the message in conjunction with information about the message itself.

For each attribute a utility is calculated of sending a particular message. In a particular example, if the attribute value is met or exceeded by the communication channel vector and the sending device vector, and the receiving device vector, then the utility is 1. Otherwise the utility is zero (see box 103 of FIG. 10). (It is noted that any suitable function for utility can be used, pre-specified or learnt by the system on the basis of past behaviour.) A utility relation vector is then formed describing the relation of utilities when sending the message via one communication channel compared to another (see box 104 of FIG. 10). A cost relation vector is also formed. This describes the relation of costs when sending the message via one communication channel compared to another (see box 105 of FIG. 10). The cost and utility relation vectors are concatenated (see box 106) and any suitable metric is then used over the concatenated vectors to rank the communication channels in terms of utility and cost (see box 107).

In the example described above the utility is calculated without reference to preferences of the recipient (other than attributes of the recipient device or entity). However, in another embodiment attributes relating to recipient preferences are also used in the calculation of utility. Recipients are, for example, able to define multipliers for specific attributes and/or communication channels to decrease the utility for unwished communication forms. For example, the recipient could specify that no e-mail should be received for a pre-defined period of time because the recipient has no time to manage an overloaded e-mail Inbox.

The example of FIG. 10 is now described in more detail.

The attribute vector $A=(a_1, a_2, \ldots, a_n)$ describes relevant attributes in the communication space. Message characteristics are described by a function M over the attribute value space A:

$M: A \mapsto M$ with $A \subset R^n$ and $M \subset R^k$. Where n is the number of components in the vector and R is the set of real numbers.

The message attributes $m_i: (a_1, \ldots, a_n) \mapsto m_i(m_1, \ldots, m_n) \in R$ summarize the characteristics of the message to be delivered. The relevance (attribute weighting) of these message attributes is described by a weighting vector $W=(w(m_1), w(m_2), \ldots, w(m_n)) \in [0,1]$ which expresses the importance of elements in the attribute vector M and has the dimension of the message vector. In this example the weights are between zero and 1 although this is not essential. Any real number values for the weights can be used. Consequently, w(mi) is the minimum required value (in %) of mi; otherwise the corresponding message characteristic is disregarded. w(mi) of value 0 indicates that an attribute is not necessarily required for a message but it could increase the value of the message if it is supported by the chosen communication channel (provided that mi>0; otherwise the attribute is not required at all).

A communication channel is a combination of the network connection (e.g., GPRS) and the push message type (e.g., SMS). It is described as a vector CC with elements defined as $cc_i: (a_1, \ldots, a_n) \mapsto cc_i(a_1, \ldots, a_n) \in R$ with $m_i \subset cc_i(A)$.

This attribute vector shows the characteristics and functionalities of a communication channel.

Accordingly, the devices characteristic vectors Dj describe the features of the sending and receiving devices (D1 and D2). Their elements are defined as $d_{j,i}:(a_1, \ldots, a_n) \mapsto d_{j,i}(a_1, \ldots, a_n) \in R$ with $m_i \subset d_{j,i}(A)$.

The utility of sending the message via a communication channel x is calculated for each attribute i:

$$U_{x,i} = \begin{cases} 1 & \text{if } cc_i \wedge d_{1,i} \wedge d_{2,i} \geq m_i \\ 0 & \text{if } cc_i \vee d_{1,i} \vee d_{2,i} < m_i - m_i \cdot w(m_i) \\ 0 & \text{if } m_i \cdot w(m_i) = 0 \\ \text{Min}(cc_i/m_i; d_{1,i}/m_i; d_{2,i}/m_i) & \text{else} \end{cases}$$

for $i = 1 \ldots n$

The communication channel costs are also defined for a communication channel x as a function of the general attribute vector.

$$C_x: (a_1, a_2, \ldots, a_n) \mapsto C_x: (a_1, a_2, \ldots, a_n) \in R.$$

The outcome of the cost function Cx is the total costs incurred by sending the message via channel x.

As the utility and costs feature different dimensions, it is required to transform them in order to achieve comparability.

Therefore, the utility relation vector URx,y covers the relation of utilities when sending the message via communication channel x compared to sending it via y.

$$U_{x,y,i}^R = \begin{cases} U_{x,i}/U_{y,i} - 1 & \text{if } U_{x,i}/U_{y,i} \geq 1 \\ -U_{y,i}/U_{x,i} + 1 & \text{else} \end{cases}$$

for $i = 1 Kn$

Accordingly, the cost relations CRx,y are calculated.

$$C_{x,y}^R = \begin{cases} C_y/C_x - 1 & \text{if } C_x/C_y \geq 1 \\ -C_x/C_y + 1 & \text{else} \end{cases}$$

for $i = 1 Kn$

The values of the utility vector and the cost relation are now 'dimensionless' and can be used for further valuations. Therefore, the utility vectors and the cost relation are simply concatenated, resulting in a general relation vector Rx,y.

$$R_{x,y} = \text{concat}(U_{x,y}^R, C_{x,y}^R)$$

In order to determine whether a communication channel x is better than y, a single metric is required:

$$A_{x,y} = f(R_{x,y})$$

This calculation can, for example, be performed with the use of standard averages of functions such as weighted mean, median, etc. By using a weighted average it is possible to define the relevance for each of the elements in the relation vector Rx,y. The preference for channel x, compared to a channel y could than be stated as:

$$A_{x,y} = \frac{\sum_{i=1}^{n} w_i \cdot U_{xy,i} + \sum_{i=1}^{n} w_i \cdot C_{xy,i}}{\sum_{i=1}^{n} w_i}$$

The resulting matrix can be used to identify the most appropriate communication channel.

The following list summarizes a typical set of attributes for communication channels and messages:

| Attributes | SMS | MMS | WAP Push SI | WAP Push SL | Email |
|---|---|---|---|---|---|
| Creation Date | 0 | 0 | 1 | 0 | 1 |
| Priority levels | 0 | 1 | 1 | 1 | 1 |
| Link to external services | 0 | 0 | 1 | 1 | 0 |
| Delivery confirmation | 0 | 1 | 1 | 0 | 1 |
| Read Confirmation | 0 | 1 | 0 | 0 | 1 |
| Sender identification | 0 | 0 | 1 | 0 | 1 |
| Message class attributes | 0 | 1 | 0 | 0 | 0 |
| Message Subject Field | 0 | 50 | 0 | 0 | 255 (Outlook) |
| (Maximum)* message size | 160 | U(d) | U(d) | 0 | U |
| Multimedia content attachment (size) | 0 | U(d) | 0 | 0 | U |
| Notification lifetime control | 0 | 0 | 1 | 0 | 0 |

*U(d) = Unlimited (device dependant)

In the table above "WAP Push Si" refers to wireless access protocol service indication whereby, for example, a recipient receives an SMS message associated with a URL that links to a web page or web service. "WAP Service Load" refers to wireless access protocol service load which forces a recipient entity to load an associated URL (for example, this is often used by network operators to sell ring tones).

For each communication channel there is a cost function for calculating the total costs when sending a message via a channel. Examples of cost functions are given below. Costs for roaming, where messages are sent to recipients in mobile networks remote of the sending entity can also be incorporated in the cost functions as is apparent to the skilled person.

| | Cost function |
|---|---|
| SMS = | math.ceiling(message size/160)*5p |
| MMS = | math.ceiling(message size + attachment size)/300 kb)*20p |
| WAP Push SI = | math.ceiling (message size/160)*5p |
| WAP Push SL = | math.ceiling (message size/160)*5p |
| Email ~ | 0p |

Figure 4:
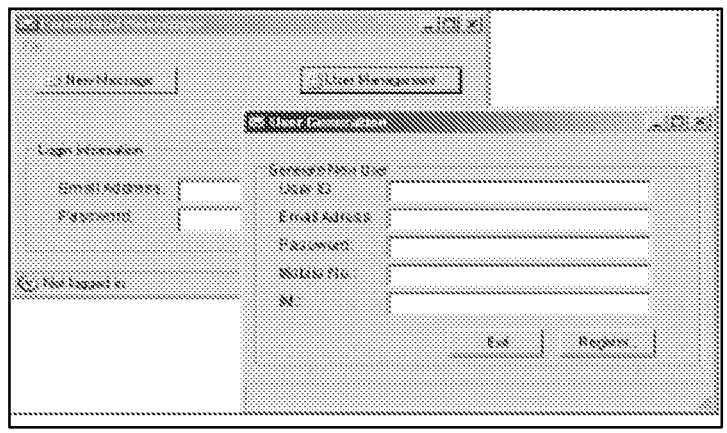
FIG. 4 is a screen shot of an example user interface to a user management part of a message service.

FIG. 4 is an example of part of a user interface for a PC arranged to inter-work with the message service. It is an example screen shot of a user management dialog whereby a new user or subscriber to the message service can be added and contact details, password and user ID set for that new user.

Figure 5:
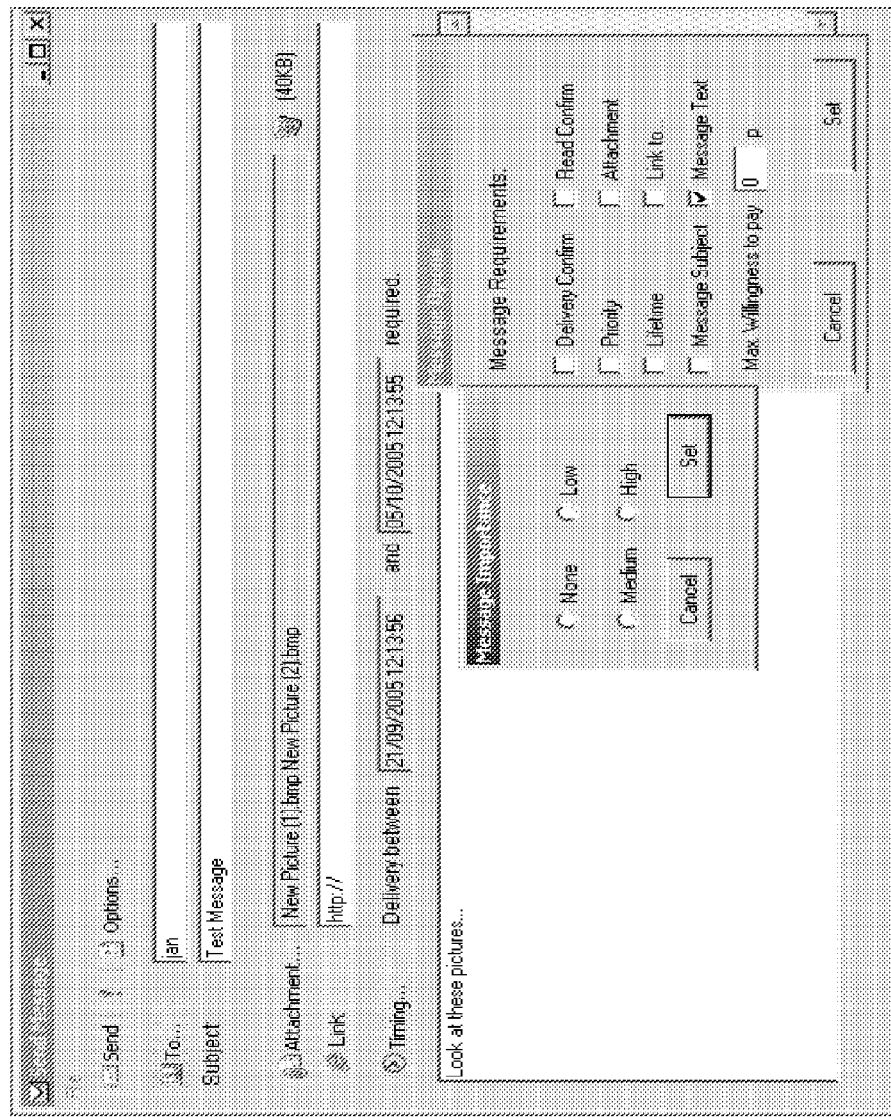
FIG. 5 is a screen shot of an example user interface to a message assembly and preference selection part of a message service for use on a PC.

FIG. 5 is an example of part of a user interface for a PC arranged to inter-work with the message service. It is an example screen shot of a message editor whereby a sender is able to collate message content parts and set message characteristics (or message attributes). For example, these attributes comprise message importance, whether delivery confirmation is required, whether read confirmation is required, whether any attachment provided in the message content must be sent with the message, whether any URI link provided in the message content must be enabled with the message, whether any message text must be sent with the message, whether a message subject is required, a priority for the message, and a lifetime for the message.

Figure 6:
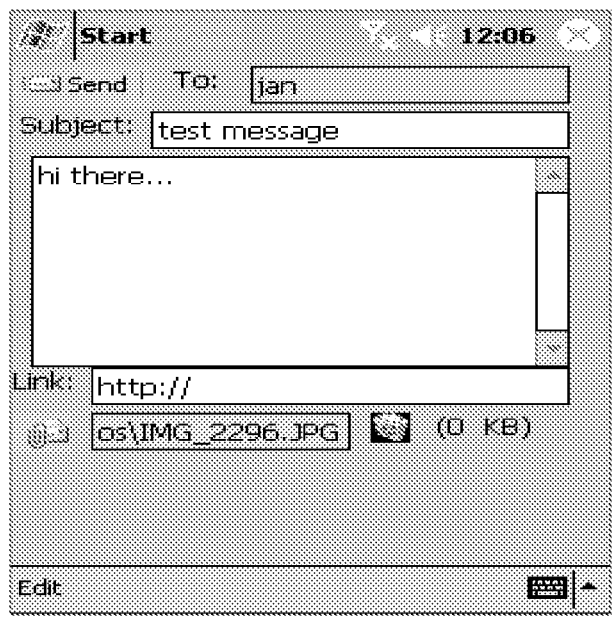
FIG. 6 is a screen shot of an example user interface to a message service for use on a PDA.
Figure 7:
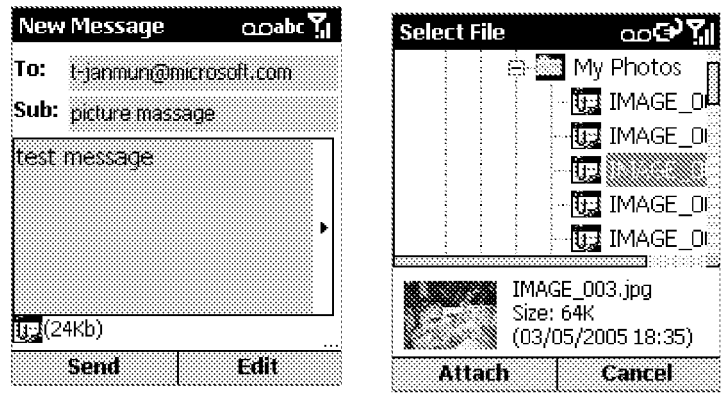
FIG. 7 is a screen shot of an example user interface to a message service for use on a smartphone.

FIG. 6 is an example of part of a user interface for use on a PDA and shows a message editor. FIG. 7 is an example of part of a user interface for use on a SmartPhone. It shows a message editor for specifying images as part of the message content.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

It is also possible for the messaging service to operate for synchronous messaging. For example, the message sent by the message server in the above examples can be configured to open up a synchronous communication session between the sending entity and the recipient entity. This is achieved in any suitable manner. For example, a SIM AT application installed on a mobile phone (typically by a network operator) can be used to force that phone to call another entity. Any suitable synchronous communication session can be opened such as a traditional voice call, a voice over internet protocol call, a chat session or other.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A message server arranged to send a message from a sending entity to a recipient entity over one of a plurality of communication channels, said message server comprising:
    an input arranged to receive message attribute values associated with the message and one or more message content parts for the message, the message content parts having been identified as components to be sent to the message server from the sending entity by user selections at a web-based communication link between the sending entity and the message server;
    an input arranged to access communication channel attribute values associated with one or more of the communication channels, sending-entity attribute values associated with the sending entity and recipient-entity attribute values associated with the recipient entity;
    a processor arranged to calculate a utility of sending the message over at least one of the communication channels on the basis of at least some of the message attribute values, communication channel attribute values, sending-entity attribute values, and recipient-entity attribute values; and
    an output arranged to recompile one or more of the message content parts for sending over one of the communication channels, said communication channel having been selected on the basis of the calculated utility, wherein the output is further arranged to send information to the sending entity about any message content parts omitted from the message.

2. A message server as claimed in claim 1 wherein the sending entity and the recipient entity each comprise messaging application software, the sending entity application software being incompatible with the recipient entity application software and wherein the output is arranged to format the message content parts for compatibility with the recipient entity application software.

3. A message server as claimed in claim 1 wherein the processor is also arranged to calculate the utility on the basis of a cost of sending the message.

4. A message server as claimed in claim 1 wherein said input is arranged to receive recipient message preference attribute values and wherein the utility is calculated also on the basis of at least some of those recipient message preference attribute values.

5. A message server as claimed in claim 1 wherein said input is arranged to receive external context information and wherein the utility is calculated also on the basis of at least some of that external context information, the external context information including information from RSS feeds.

6. A message server as claimed in claim 1 wherein said processor is arranged to form a utility relation vector covering the relation of utilities when sending the message via one communication channel compared to another.

7. A message server as claimed in claim 6 wherein said processor is also arranged to form a cost relation vector.

8. A message server as claimed in claim 7 wherein the processor is arranged to concatenate the utility relation vector and cost relation vector and to apply a metric to the concatenated vector to enable the communication channels to be ranked.

9. A message server as claimed in claim 8 wherein the output is also arranged to send information about message status to the sending entity and or the recipient entity.

10. A message server as claimed claim 1 wherein the output is also arranged to send information to the recipient entity about any message content parts omitted from the user selections for sending.

11. A method of sending a message from a message server to a recipient entity over one of a plurality of communication channels using one or more computer executable instructions stored on a computer-readable storage media, the executable instructions when executed on a processor implement the method comprising the steps of:
    receiving message attribute values associated with the message and one or more message content parts for the message, the message content parts having been identified as components to be sent to the message server from the sending entity by user selections at a web-based communications link between a sending entity and the message server;
    accessing communication channel attribute values associated with one or more of the communication channels, sending-entity attribute values associated with the sending entity, and recipient-entity attribute values associated with the recipient entity;
    calculating a utility of sending the message over at least one of the communication channels on the basis of at least some of the message attribute values, communication channel attribute values, sending-entity attribute values, and recipient-entity attribute values; and
    sending information to the sending entity about any message content parts omitted from the message.

12. A method as claimed in claim 11 wherein the sending entity and the recipient entity each comprise messaging application software, the sending entity application software being incompatible with the recipient entity application software and wherein the step of formatting one or more of the message content parts comprises doing so for compatibility with the recipient entity application software.

13. A method as claimed in claim 12 which further comprises:
    calculating the utility on the basis of a cost of sending the message.

14. A method as claimed in claim 13 which further comprises:
   receiving recipient message preference attribute values and wherein the utility is calculated also on the basis of at least some of those recipient message preference attribute values.

15. A method as claimed in claim 14 which further comprises:
   receiving external context information and calculating the utility on the basis of at least some of the external context information.

16. A method as claimed in claim 11 which further comprises:
   forming a utility relation vector covering a relation of utilities when sending the message via one communication channel compared to another.

17. A method as claimed in claim 16 which further comprises:
   forming a cost relation vector.

18. A method as claimed in claim 17 which further comprises:
   concatenating the utility relation vector and cost relation vector and applying a metric to the concatenated vector to enable the communication channels to be ranked in terms of utility and cost.

* * * * *